Feb. 10, 1953 G. C. ELLERBECK 2,628,031
DECIMAL POINT MARKER
Filed Nov. 2, 1951 3 Sheets-Sheet 1

GRANT C. ELLERBECK
INVENTOR
BY Robyn Wilcox
ATTORNEY

Feb. 10, 1953     G. C. ELLERBECK     2,628,031
DECIMAL POINT MARKER
Filed Nov. 2, 1951     3 Sheets-Sheet 2
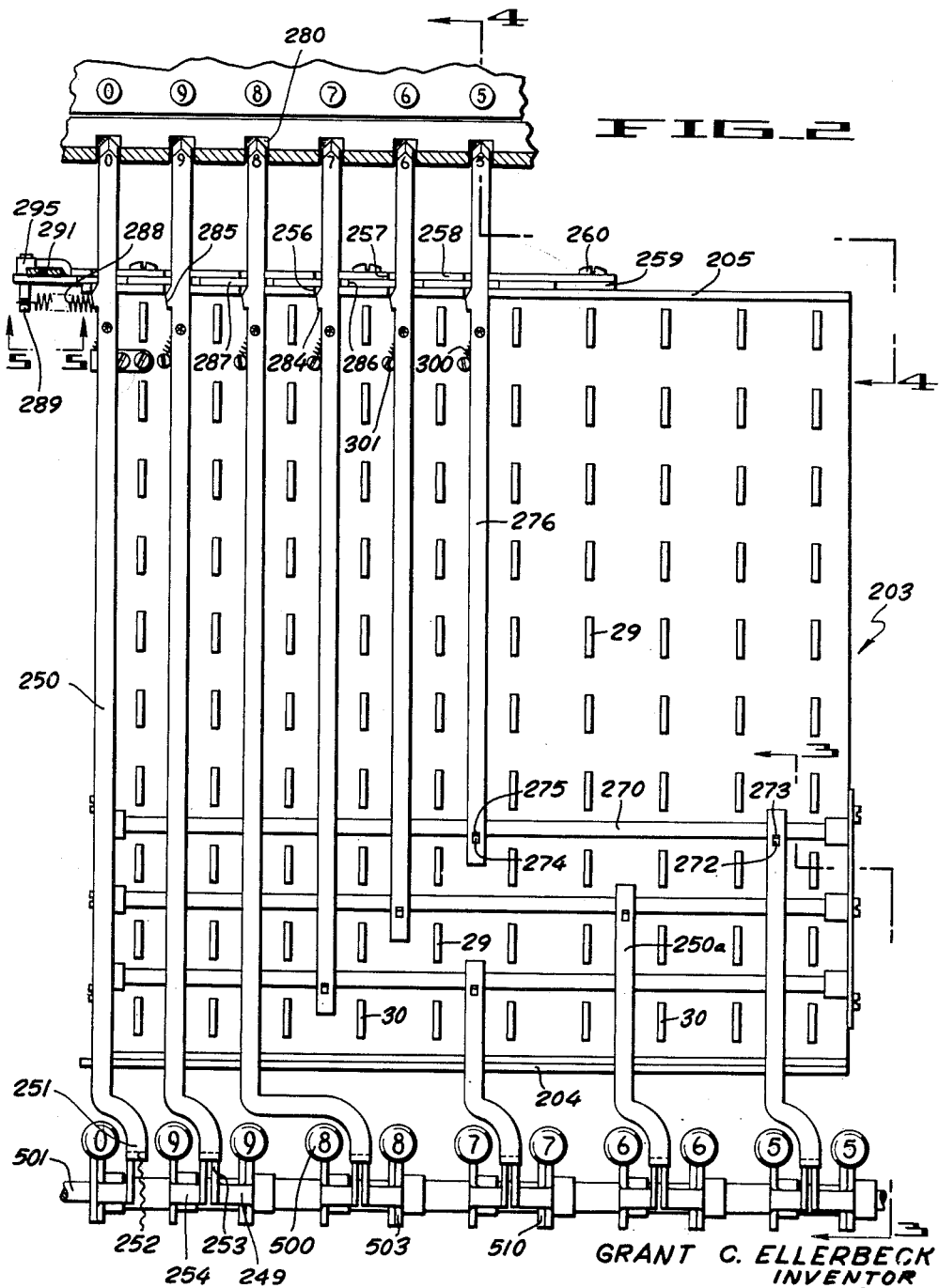
GRANT C. ELLERBECK
INVENTOR
BY Robyn Hilcox
ATTORNEY Feb. 10, 1953  G. C. ELLERBECK  2,628,031
DECIMAL POINT MARKER
Filed Nov. 2, 1951  3 Sheets-Sheet 3
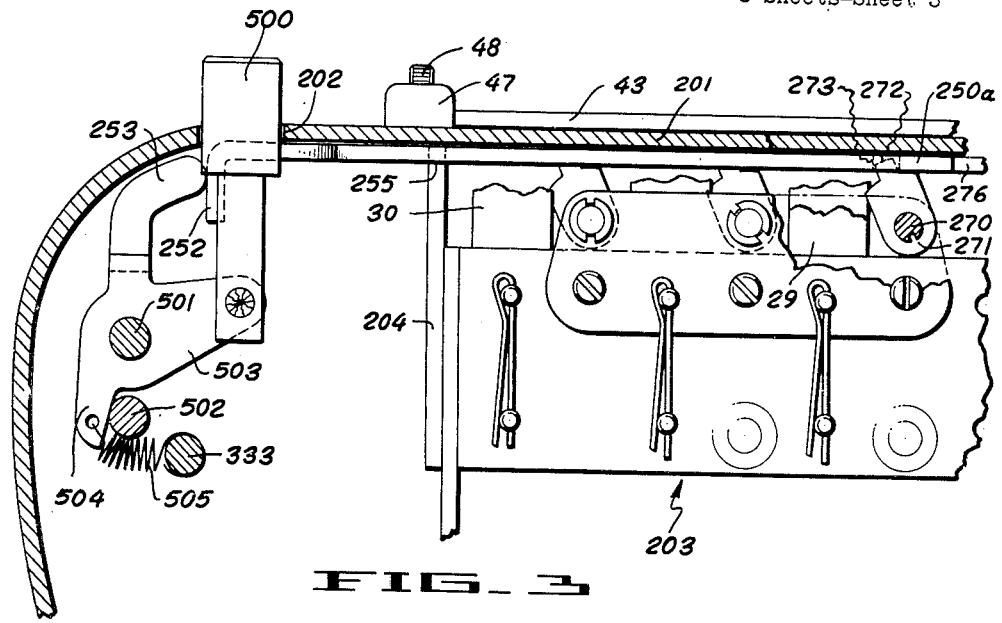
FIG_3
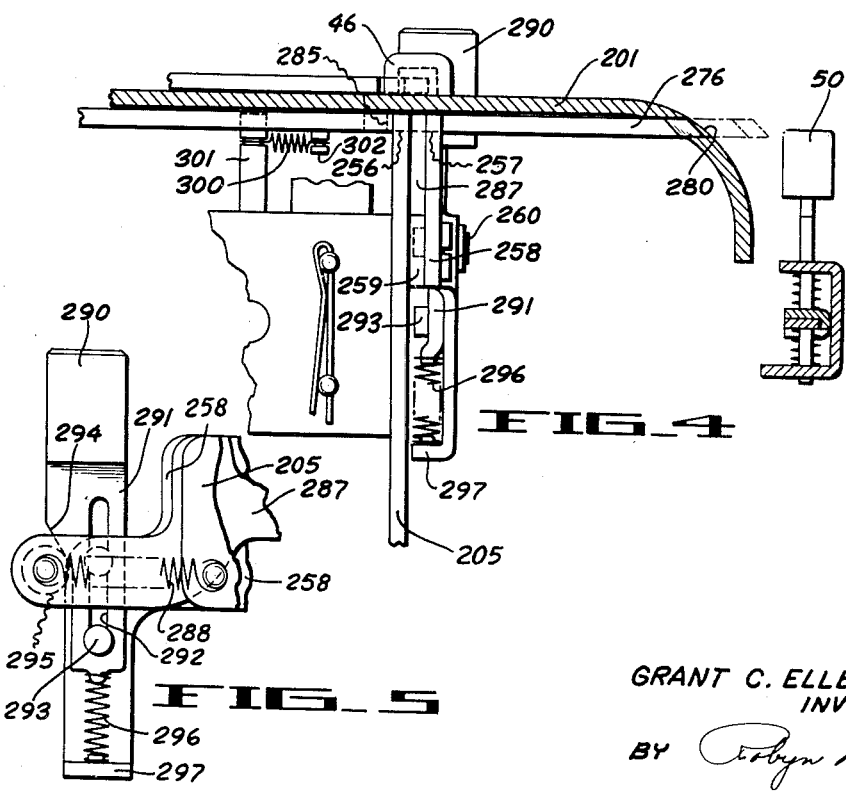
FIG_4
FIG_5
GRANT C. ELLERBECK
INVENTOR
BY *Robyn Wilcox*
ATTORNEY Patented Feb. 10, 1953

2,628,031

UNITED STATES PATENT OFFICE 2,628,031

DECIMAL POINT MARKER

Grant C. Ellerbeck, San Leandro, Calif., assignor to Friden Calculating Machine Co., Inc., a corporation of California Application November 2, 1951, Serial No. 254,545

8 Claims. (Cl. 235—145)

This invention relates to an automatic decimal indicator for a calculating machine.

The primary purpose of the present invention is to provide an automatic decimal point indicator for a square root calculating machine, such as the type embodied in the square root calculating machines distributed by the Friden Calculating Machine Co., Inc.

Another important object of the present invention is to provide an automatic decimal point mechanism operated by the operation initiating key.

Another important object of my invention is to provide an automatic decimal point indicating mechanism operated by a decimal point indicator in the keyboard to indicate the correct decimal point in the carriage.

One of the difficult problems in calculator machine design is to provide a foolproof decimal point indicator for the registers in the carriage. The provision for decimal point indicators in the selection mechanism has been easily solved and affords no problem at the present time. However, unless an operator is familiar with the rules for pointing off decimals, inaccuracies may occur through the improper setting of the decimal point in the product or quotient registers, with the result that inaccurate answers are copied by the operator. This is particularly true in relation to problems of square root. The decimal point in the answer, or root, is equal to the number of groups of two in the radicand.

In my machine for extracting square root, above referred to, I provided a plurality of initiating keys extending across the front of the keyboard and aligned with the regular decimal point indicators of the keyboard. Depression of the key in line with the decimal point of the radicand operated to initiate the extraction of square root in the proper order. I also used the tops of the initiating keys as indicators to show the location of the decimal point in the quotient register. This previous mechanism simplified the pointing off of the decimal point in the root by numerically showing the location of the decimal point in the root. My present invention relates to a means operated by the square root initiation keys which operate automatically to indicate the proper location of the decimal point in the root, when the machine has fully extracted the root.

These and further objects of the invention will be apparent from the instant application, and in the claims which follow, and by a consideration of the drawings in which:

Fig. 2 is a plan view of the keyboard of the machine shown in Fig. 1, with the cover and key tops removed, to show the automatic decimal point indicating mechanism of my invention.

Fig. 3 is a longitudinal cross-sectional view of the front of the keyboard, taken on a plane parallel to the orders of the keyboard, such as along the planes indicated by the line 3—3 of Fig. 2.

Fig. 4 is a longitudinal cross-sectional view of the rear end of the keyboard, and the decimal point indicators associated therewith, taken on a plane parallel to the orders of the keyboard, such as along the planes indicated by the line 4—4 of Fig. 2.

Fig. 5 is a transverse cross-sectional view of a detail of the indicator latching mechanism and release therefor, such as taken along the transverse vertical plane indicated by the line 5—5 of Fig. 2.

Figure 1:
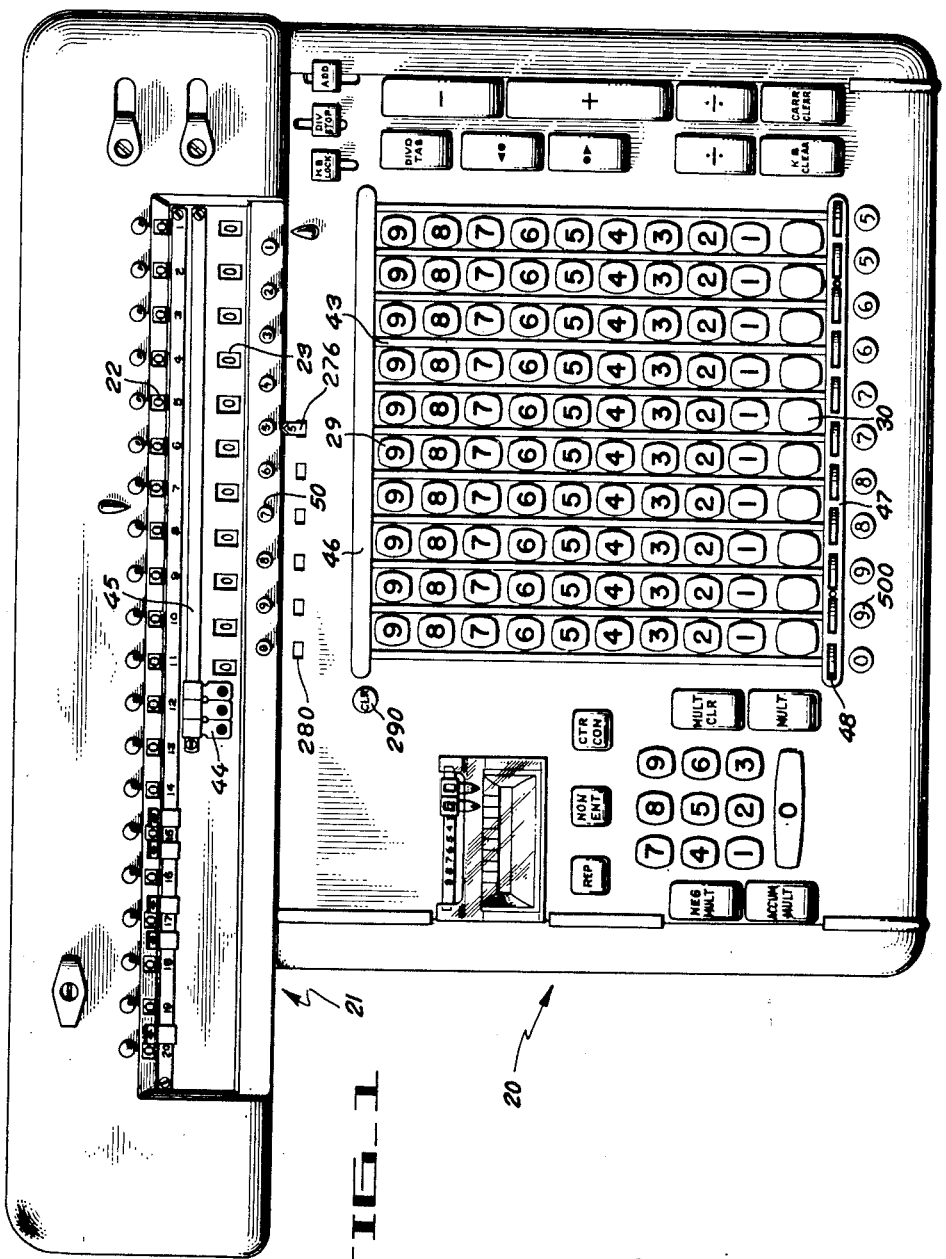
Fig. 1 is a plan view of a calculating machine capable of extracting square root.

My invention is shown as embodied in a conventional calculating machine of the type shown in the patent to Friden #2,229,889, issued January 28, 1941. Briefly such a calculator comprises a main frame or body 20, upon which is mounted a shiftable carriage 21 movable in either direction to provide for plural order operation. The carriage 21 contains an accumulator register 22 and a counter register 23, which in square root operations receives the radicand and the root respectively. In the case of square root operations the radicand is inserted in the accumulator register 22 and the operation of the machine in the extraction of square root operates to place the root in the quotient register 23.

A conventional keyboard comprising banks of value keys 29 and the zero, or ordinal clear, key 30 is arranged in the main body portion of the machine. The keyboard is provided with suitable decimal markers which may comprise ordinally arranged bars 43 rotatably mounted above a top cover plate of the machine and between the orders of the keyboard in the flanges 46 and 47. As is well known in the art, the bars 43 have at least two sides, one of which is colored the same color as the top of the machine cover, while another is colored in a contrasting color. The bars are rocked by suitable knobs 48, and when rocked in one direction the bars, being of the same color as the cover of the machine, are hardly distinguishable. On the other hand when a bar 43 is rocked in the other direction, the contrasting color with which that portion of the bar is painted stands out noticeably and is a good indication of the decimal point in the value standing in the keyboard. Decimal markers are also provided for the accumulator register 22 and the counter or quotient register 23. These may comprise tabs 44 with a decimal point imprinted thereon, which tabs are slidable along a bar 45. The decimal marker tabs are used to indicate the decimal point standing in the respective registers.

The conventional machine shown for purposes of exemplification in Fig. 1, is also provided with a plurality of tabulating keys 50 mounted in the carriage 21. These keys are operable to position a tabulating stop, so that in those operations in which the carriage is automatically shifted to a preselected position either at the start or at the end of an operation, the carriage will be accurately and automatically positioned. These keys are conventionally marked "1" to "9" and "0" inclusive, beginning on the right and are indicative of tabulation of the carriage 21 to a position in which that order of the carriage registers is in line with the units order of the actuator.

It will be understood that the machine shown in my preferred form has selection, actuating and digitating mechanisms conventional in machines of this kind. These mechanisms need not be described herein as they form no part of my invention, which is limited to an automatic mechanism for determining the decimal point, particularly in square root operations.

Previous to the square root machine above-referred to, it was necessary for the operator to count the groups of two in the radicand (from the decimal point) and to then place the decimal point tab 44 along the bar 45 in the proper position to show the decimal point in the root. As will be recalled, the decimal point in the root is equal to the number of groups of two in the radicand.

I prefer to initiate a square root operation by means of a plurality of keys 500 extending ordinally along the front of the keyboard, in line with the ordinal keyboard decimal markers 43. In such a machine the depression of a key aligned with the decimal point of the radicand operates to initiate the square root operation in the proper order. In my preferred form, the radicand is set into the left-hand keys of the keyboard and then transferred into the register dials with the carriage in a right-hand position. The key in line with the decimal point of the radicand (the keyboard value), is depressed in order to initiate the extraction of operation in the proper order. In my preferred construction the keys 500 to the right of the odd numbered orders of the keyboard (that is, to the right of the 1st, 3rd, . . . and 9th orders) operate to initiate the extraction of square root in the 9th order of the selection mechanism. Similarly the square root initiating keys 500 to the right of the even orders of the keyboard (that is, the 2nd, 4th, . . . and 10th) operate to initiate the extraction of square root in the 10th order of the selection mechanism. The depression of one of the square root keys 500 also operates to assist in the pointing off of the root into the proper decimal figure. This was accomplished by marking the two decimal point initiating keys 500 lying to the right of the 10th and 9th orders with a "9"; those to the right of the 8th and 7th orders with an "8"; those to the right of the 6th and 5th orders with a "7"; those to the right of the 4th and 3rd orders with a "6" and those to the right of the 2nd and 1st orders with a "5." I also preferred to mark the square root initiating key 500 lying to the left of the 10th order with a "0."

It can be noted that the tabulating keys 50 in the "Friden" machine used for purposes of exemplification, are marked from "1" to "9" and "0" beginning on the right of the counter register (the "1" key lying between the 1st and 2nd orders of the counter register, etc., as shown in Fig. 1). Previously, the operator could set the decimal point of the root by sliding a decimal point tab 44 along the bar 45 until it lay opposite the tabulator key 50 with the number similar to that of the square root initiating key depressed. Thus for example, if the radicand was "625" the left-hand "8" key or button 500 would have been depressed to initiate the square root operation, and the decimal point tab 44 would have been moved to the right along the slide 45 until it lay opposite the tab key 50 marked "8." On the other hand if the value had been "62.5," then the right-hand "9" key for the initiation of square root would have been depressed and the tab 44 would have been slid along the bar 45 until it lay opposite the tabulating key 50 marked "9."

This method while quite convenient, and removing much of the guesswork, or inaccurate manipulation, of inexperienced operators, left much to be desired. My present invention relates to a mechanism by means of which the depression of the proper square root initiating key 500 will operate to automatically indicate the proper decimal point in the root, when the operation is finished. Briefly, my invention comprises a mechanism by means of which the two "5" square root initiating keys will operate to position a marker which will stand opposite the "5" tabulator key 50 when the carriage 21 reaches its extreme left-hand position, which is the position in which it is located at the end of an extraction operation. Similarly the two "6" keys will operate to position a marker, or pointer, opposite the "6" tabulating key 50, etc. The mechanism for this is shown particularly in Figs. 2 to 4, inclusive.

The initiation of a square root operation is caused by a depression of one of the square root initiating keys 500. It can be noted briefly that the keys 500 are pivotally mounted on a substantially horizontal arm of bellcranks 503 (as is shown in Fig. 3). Each key 500 projects through an aperture 202 in the machine cover 201 and is maintained in its upright position by means of a tension spring 505 tensioned between a tail 504 of the bellcrank 503 and a cross-shaft 333. Each bellcrank 503 is pivotally mounted on a transverse shaft 501. The tails 504 of the bellcrank abut against a second cross-shaft 502 lying below the first shaft 501. Associated with the bellcranks 503 lying to the right of the odd numbered orders of the keyboard (or the left of the even numbered orders) is a second bellcrank 510 pinned to the shaft 501 (see Fig. 2). The lever 510 carries a stud, not shown, lying beneath the lower edge of the horizontal arm of the bellcrank 503 so that rocking of the bellcranks 503 lying to the right of the odd numbered orders of the keyboard operates to rock shaft 501 and to initiate extraction of square root in a predetermined order. The rocking of the alternate bellcranks i. e., those to the right of the even numbered orders of the keyboard, operates through the bellcranks 503 to rock shaft 502 to initiate the extraction of square root in an adjacent order of the keyboard.

The depression of any square root initiating keys 500, through rocking of its bellcrank 503, operates in my present invention to position the indicating members which automatically point off the root in the counter register 23. Preferably the decimal point indicators are slides such as 250 and 276 (see Fig. 2), the former being utilized for the higher order keys and the latter for the lower order keys. These slides 250 and 276 lie immediately below the cover plate 201 and preferably in line with the tabulating keys 50 (when the carriage is in its extreme left-hand position, shown in Fig. 1). Thus for most of their length they are also aligned with one of the initiating keys 500. The slides 250 for the higher orders such as the "8," "9" and "0" initiating keys 500 are bent horizontally at 251 so that the forward ends thereof lie laterally adjacent, and between, the initiating key, or keys, 500 that operate the respective slide. In my preferred form (shown in Fig. 2) the slide 250 related to the "0" key is in line with that key, while the slide 250 for the pair of "9" keys is aligned with the leftmost "9" key or between the 9th and 10th orders of the keyboard, and the slide associated with the "8" lies between the 8th and 9th orders of the keyboard. The forward ends of these slides are provided with a depending ear 252 (see Fig. 3) adapted to engage the associated bellcrank, or bellcranks, 503. The bellcranks 503 (as shown in Fig. 3) have an upwardly extending arm 253 bent to lie between each pair of keys and to engage the ear 252 of the associated slide. That is, the upwardly extending arms 253 of the right-hand bellcrank of each pair of keys (i. e., those to the right of the odd numbered orders) are bent to the left, as at 249, as shown in Fig. 2, while those of the left-hand bellcranks are bent to the right, as at 254 so as to engage the same ear 252. Thus depression of either one of the pair of keys operates to move the associated slide 250 rearwardly.

The slides 250 are supported in suitable apertures 255 in the front frame member 204 of the keyboard 203 and in the apertures 256 in the rear frame plate 205. The slides 250 extend to the rear of the machine and, when moved rearwardly, project through suitable apertures 280 in the rear part of the machine cover (as shown particularly in Fig. 4). Preferably, a slight rearward movement is sufficient to cause them to project through the cover and to be readily visible to the operator. These slides will be painted a distinctive color with respect to the color of the cover plate so as to be readily noticeable to the operator.

The slides associated with the right-hand groups of initiating keys 500 are preferably somewhat different in form, as the simple form used on the left of the keyboard would not be satisfactory due to the length of the bent-over portion. For such keys I prefer to use the form shown on the right-hand side of Fig. 2 and shown also in Fig. 3. The slides that are associated with the right-hand initiating keys 500 are relatively short in length, extending rearwardly through the apertures 255 of the front frame plate 204. The rear end of each of these slides is supported on a single tooth gear member 271 keyed, or otherwise rigidly secured, to a transverse shaft 270. The single tooth 272 of the gear plate 271 is embraced by a suitable slot or aperture 273 in the rear end of the respective slide 250a. The shaft 270 also carries a second single tooth gear member (not shown but lying directly behind the respective gears 271 in Fig. 3), the single tooth 274 of which is embraced by a suitable aperture 275 in a rearwardly extending indicating slide 276. The second gear member is also keyed, or otherwise rigidly secured, to the cross-shaft 270 so that translation of a stub slide 250a toward the rear, rocks its associated shaft 270, which in turn translates the associated slide 276 to the rear. The slides 276, like those on the left of the machine (250) are supported at their rearward ends by suitable apertures 256 in the rear frame plate 204 of the keyboard, and when translated also project through suitable apertures 280 in the cover plate.

A suitable bracket member 258 is spaced secured to the rear keyboard frame plate 205, being spaced therefrom by a suitable spacing member 259 and rigidly mounted on the plate 204 by suitable screws 260. The bracket 258 is also provided with apertures 257 to receive the slides 250 or 276 for forward or rearward translation.

The indicating slides 250 and 276 are provided with a cam faced projection 285 as shown in Fig. 2, which is provided with a latching shoulder 284. Associated with the projection 285 is a latching slide 287 provided with suitable apertures 286. The latch slide 287 is normally urged toward the right by a suitable spring 288 tensioned between a pin 289 on the latching slide and a suitable stud, not shown, on the keyboard frame 203. Thus the rearward translation of either of the slides 250 or 276 forces the latching slide 287 to the left which, as soon as the shoulder 284 has passed the aperture, is spring-urged to the right to latch the indicating slide in its rearward, or marking, position. The slide is therefore latched in its indicating position until released by depression of a release key 290 (Figs. 1 and 4) as will now be described.

The release key 290 is mounted on a suitable key stem 291 (see Fig. 5) which is provided with a suitable slot 292. The slot 292 embraces a pair of studs 293 on the bracket member 258 and is yieldably urged to its raised position by a compression spring 296 compressed between the lower end of the key stem 291 and an ear 297 on the lower part of the bracket 258. The key stem 291 is provided with a suitable cam 294 which engages a roller 295 mounted on the latching plate 287 (see Fig. 5). Thus depression of the key 290, operating through cam 294 and roller 295, moves the latching slide 287 to the left to release the shoulder 284 on the indicating slides 250 or 276. When so released the slides return to their forward, or non-indicating, position through the force of springs 300, tensioned between a stud 301 on the keyboard frame and a stud 302 mounted on the lower side of the slide.

The operation of the mechanism of my invention is believed obvious from the preceding description. Briefly, the depression of the square root initiating key, in rocking bellcrank 503, causes the arm 253 thereof to push the slide 250 or 276 rearwardly. Rearward translation of the slides 250 and 276 cause their rearward ends to project through the apertures 280 and thus indicate the decimal point of the root, when the carriage reaches the terminal position and the extraction is terminated. In those instances in which the indicating slides are relatively close to the initiating key, the slides can be bent as shown in the left-hand side of Fig. 2. On the other hand, when they are removed a relatively large distance, they can follow the embodiments shown in the right-hand side of that figure. In either event depression of the square root initiating key 500 operates to indicate the correct decimal point in the root to be extracted, when the carriage reaches its terminal position.

It can also be noted that in the preferred form shown in the drawings, the rear ends of the pointers 250 and 276 are numbered to correspond to the numbers appearing on the tabulating keys 50, and the square root initiating keys 500. If the extraction of square root is stopped before the carriage reaches its extreme end position, i. e., the machine stopped before the operation is completed, the one pointer projected bears the same number as the initiating key and also of the tabulating key marking the correct decimal position. By this means I am enabled to retain a marking of the correct decimal position, even though I stop the operation of the machine before the carriage reaches its terminal position.

I claim:

1. In a calculating machine having ordinally arranged keys for initiating an operation and a quotient register, a decimal point indicating device comprising ordinally arranged indicating members, and means operated by said initiating keys for translating the corresponding member, said members extending rearwardly to a position adjacent the quotient register of said machine.

2. A decimal point indicating device for a calculating machine having a shiftable quotient register which comprises a plurality of ordinally arranged slides extending to a point adjacent said quotient register, a plurality of ordinally arranged initiating keys, and means operated by said keys for moving the associated indicating member.

3. The apparatus of claim 2 comprising also means for latching said indicating member in an indicating position and means for releasing said latching means.

4. A decimal point indicating device for a square root calculating machine having a shiftable quotient register and a plurality of ordinally arranged initiating keys, which comprises a plurality of ordinally arranged slides extending from adjacent said keys to a point adjacent said quotient register, and means operated by said keys for moving the associated indicating member.

5. In a square root calculating machine having ordinal keys for initiating the square root operation and a quotient register shiftable with respect to said keys, a decimal point indicating device comprising ordinally arranged indicating and normally invisible slides extending rearwardly to a position adjacent the quotient register of said machine, means operated by said square root initiating keys for translating the corresponding slide rearwardly, and means for enabling a slide to become visible when translated rearwardly.

6. In a square root calculating machine having a cover, ordinal keys for initiating the square root operation extending through said cover, and a quotient register, a decimal point indicating device comprising ordinally arranged indicating slides extending rearwardly below said cover to a position adjacent the quotient register of said machine and normally retracted under said cover, and means operated by said square root initiating keys for projecting the corresponding slide from under said cover.

7. In a calculating machine having an ordinally arranged shiftable quotient register, an ordinally arranged keyboard, and a plurality of ordinally arranged operation initiating keys, a decimal point indicating device which comprises an indicating member associated with each pair of operation initiating keys and operated by each of them, said indicating means having an indicating portion extending to a point adjacent a preselected order of said quotient register when said quotient register is in a predetermined terminal position with respect to said keyboard.

8. The apparatus of claim 6 comprising also a printed indicia on the projecting portion of said slide corresponding to the correct decimal point position in the root.

GRANT C. ELLERBECK.

REFERENCES CITED

The following references are of record in the file of this patent:

UNITED STATES PATENTS

| Number | Name | Date |
|---|---|---|
| 2,329,190 | Ellerbeck | Sept. 14, 1943 |
| 2,329,218 | Reynolds | Sept. 14, 1943 |
| 2,467,419 | Avery | Aug. 19, 1949 |